April 19, 1932.  J. SCHWEITZER  1,854,350
METHOD OF PREPARING COLORED ANIMAL TISSUE AND PRODUCT
Filed Aug. 14, 1930
Fig-1
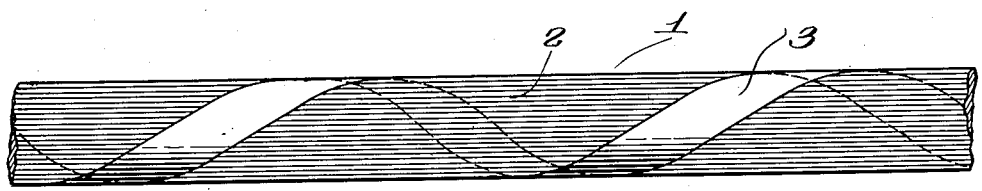
Fig-2
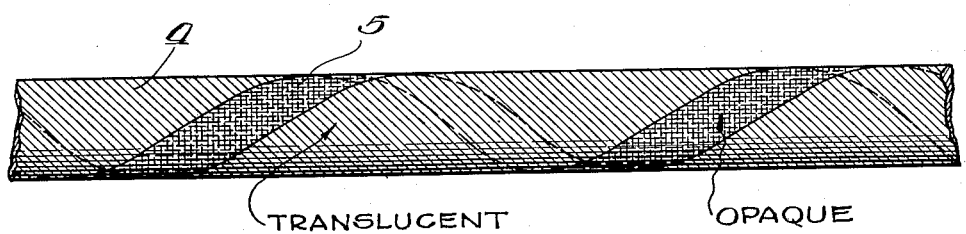
TRANSLUCENT  OPAQUE
Fig-3  Fig-4
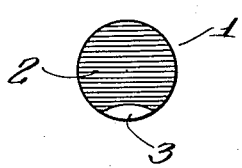 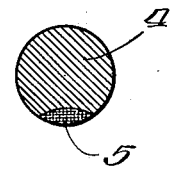
Inventor:
Joseph Schweitzer.

Patented Apr. 19, 1932

1,854,350

UNITED STATES PATENT OFFICE

JOSEPH SCHWEITZER, OF CHICAGO, ILLINOIS, ASSIGNOR TO HARRY L. DIEHL, OF CHICAGO, ILLINOIS

METHOD OF PREPARING COLORED ANIMAL TISSUE AND PRODUCT

Application filed August 14, 1930. Serial No. 475,351.

This invention relates to a method of preparing colored animal tissue and to the product so prepared, and more particularly to a method of preparing multi-colored gut stringing for tennis rackets, musical instruments, and the like.

It has heretofore been proposed to color animal tissue, such as gut stringing, with ordinary water soluble dyes, such as the so-called coal tar dyes. Where merely a single colored stringing is desired, this method is perfectly satisfactory and brightly colored, translucent gut stringing can be so produced. However, if it is desired to obtain a two-tone effect, the use of more than one water soluble dye to produce such effect is not satisfactory, since the tendency is for the different colors to blend together, or bleed, to produce an intermediate shade.

I have now found that animal tissue may be suitably colored by means of pigments and that distinct and pleasing multi-colored effects may be obtained by combining animal tissue or gut strands that have been colored with a water soluble dye with others that have been colored by precipitation in situ of a pigment. This, then, forms the object and purpose of the present invention.

Other and further important objects of this invention will become apparent from the following description and appended claims.

My process for coloring animal tissue with a pigment comprises successively treating the animal tissue with separate aqueous solutions of each of two or more metallic salts capable of reacting together by double decomposition to form an insoluble colored compound, or pigment. The term "colored" as herein used includes white and black, as well as the true colors. Preferably, the separate aqueous solutions are of about 5% strength, but the concentration can be varied between any limits depending upon the solubility of the metallic salts used. In my preferred method, the animal tissue is first allowed to soak in an aqueous solution of a soluble metal salt, such as potassium bichromate for a few minutes up to a half an hour, or even more, and then the animal tissue is removed and immersed in an aqueous solution of another soluble metal salt, say, lead acetate, for a corresponding length of time, after which it is removed, washed thoroughly, and air dried. With the particular metal salts referred to, a yellow pigment, lead chromate, is formed by precipitation in situ within and throughout the mass of animal tissue.

Any other combination of soluble metal salts, which react by double decomposition to yield a pigment, may be used. For instance, to make white colored animal tissue, solutions of barium chloride and sodium sulphate, lead acetate and sodium carbonate, or strontium nitrate and sodium carbonate might be used. To produce a red, solutions of silver nitrate and potassium chromate, or a soluble antimony salt, such as antimony trichloride with sodium sulphide produce satisfactory results. The use of solutions of cadmium nitrate and sodium sulphide results in the formation of a yellow pigment, and of solutions of copper sulphate and sodium carbonate, a green pigment.

It will be understood, however, that in general any proper combination of water soluble metallic salts can be used to give the desired color. The pigment is formed in situ within and throughout the mass of animal tissue in a very finely and uniformly dispersed state, the colloidal nature of the animal tissue assisting in the absorption and dispersion of the pigment. Animal tissue when so colored is opaque and not translucent, as in the case of animal tissue colored with a water soluble dye.

In preparing a multi-colored animal tissue, such as gut stringing for tennis rackets, musical instruments, and the like, a bunch of gut strands is first colored with a pigment as above described and other bunch of gut strands colored with a water soluble dye in the usual manner. Acid, basic, and direct dyes can all be used in a manner well known to the art.

The separate bundles of gut strands so colored, after being thoroughly washed with pure water and while still wet or moist, are spun in the usual manner to produce the gut stringing for tennis rackets or the like. After being spun, the twisted strands are allowed to dry in the air under tension, the result being a single string of coherent strands having a multi-colored effect. When viewed by reflected light, the distinctive effect of the respective pigments and dyes is produced but when viewed by transmitted light, the portion of the string colored with the dye appears translucent, while the portion colored with the pigment is opaque. There is thus produced a very distinctive and pleasing effect, which is heightened by the well defined and separate coloring produced by the use of a water soluble dye in combination with a pigment.

The stringing of my invention is illustrated in the accompanying drawings, in which:

Figures 1 and 2 are fragmentary elevational views of gut strings suitably colored, and Figures 3 and 4, respectively, are end views of the gut strings of Figures 1 and 2.

The reference numeral 1 indicates a gut string composed of a bundle of strands 2 colored with a blue dye and a bundle of strands 3 colored with a white pigment, all in the manner above described. The respective colors extend throughout the mass of the respective strands, as indicated in Figure 3.

In Figures 2 and 4 is illustrated a gut string having green and yellow strands, 4 and 5, respectively, colored with a suitable green dye and a yellow pigment, respectively. The strands 5, being opaque, stand out against the translucent strands 4 and produce a very unusual and pleasing effect when viewed by transmitted light and when viewed by reflected light the respective colors show up very distinctively because of the definite character of the coloring permitted by the use of a water soluble dye and a pigment.

By the term "pigment" it is meant to include also insoluble color lakes that can be deposited in situ in the animal tissue.

I am aware that numerous details of the invention may be varied through a wide range without departing from the spirit of this invention, and I do not desire to limit the patent granted other than as necessitated by the prior art.

I claim as my invention:

1. Multi-colored gut stringing for tennis rackets and the like comprising a single string spun from a plurality of strands, certain of said strands being colored with a water soluble dye and others with a pigment of different color, the string having corresponding alternately translucent and opaque portions.

2. Multi-colored gut stringing comprising coherent twisted strands of gut, bundles of said strands being colored with a water soluble dye and therefore translucent and other bundles of said strands being distinctively colored with a pigment and opaque.

In testimony whereof I have hereunto subscribed my name at Chicago, Cook County, Illinois.

JOSEPH SCHWEITZER.